Nov. 6, 1951  H. F. HAMLIN  2,573,967
ELECTRICAL PRECIPITATION METHOD
Filed May 1, 1947

INVENTOR.
HENRY FREDERICK HAMLIN
BY
Blair, Curtis & Hayward
ATTORNEYS.

Patented Nov. 6, 1951

2,573,967

UNITED STATES PATENT OFFICE 2,573,967

ELECTRICAL PRECIPITATION METHOD

Henry Frederick Hamlin, Manlius, N. Y., assignor to United States Hoffman Machinery Corporation, New York, N. Y., a corporation of Delaware Application May 1, 1947, Serial No. 745,146

2 Claims. (Cl. 204—184)

This invention relates to the removal of suspended foreign matter from a liquid, and more particularly to a method and apparatus for electrostatically precipitating solids from a liquid with a high dielectric constant. The method and apparatus of the invention are particularly well adapted to be used in removing suspended dirt particles from a used dry cleaning solvent and will be described in connection with this application, although as the description proceeds it will be apparent that they can also be used to remove other types of suspended foreign materials from other types of high dielectric liquids.

In conventional dry cleaning processes the goods to be cleaned are commonly placed in a tumbler comprising a rotatable foraminous drum mounted for rotation in a closed casing. A quantity of a solvent, e. g., the well-known Stoddard solvent (a petroleum base solvent having a flash point of the order of 100° to 105° F.), is then introduced into the tumbler casing and the drum is rotated to agitate the goods in contact with the solvent and thereby wash them. The solvent removes oily and greasy materials from the goods and also removes fine dirt particles which become suspended in the solvent. In order to recover the solvent for reuse it is necessary to remove these suspended dirt particles and their removal is ordinarily effected by passing the solvent through a conventional filter press.

The use of a filter press for removal of solids from the solvent is disadvantageous for a number of reasons. The filtration rate is relatively low even when suitable filter aids are used. In cases where it may be desirable to remove solvent from the tumbler, filter it and return it to the tumbler in a continuous circulating system such low filtration rates present a serious problem since a very large filtering area is required to achieve practicable circulation rates. The large area required means that a large filter press or a number of filter presses connected in parallel must be used.

Furthermore, the cleaning of the filter press or presses is a time and labor-consuming procedure. Also the filters are necessarily out of service during the time that they are being cleaned and hence the amount of filtering equipment required for any given installation must be increased to an extent sufficient to ensure adequate filtering capacity in service during the periods when filters are being cleaned.

Accordingly it is an object of the present invention to provide an improved method and apparatus for removing suspended foreign materials from a liquid having a high dielectric constant. It is another object of the invention to provide an improved method and apparatus for removing suspended dirt particles from a used dry cleaning solvent. It is still another object of the invention to provide a method and apparatus for removing suspended solids from a liquid that permits the use of high liquid flow rates. It is a further object of the invention to provide apparatus for removing suspended particles from a liquid which apparatus is so constructed that accumulated precipitated particles can be rapidly and easily removed from the apparatus. Other objects of the invention will be in part obvious and in part pointed out hereafter.

The many objects and advantages of the present invention can best be appreciated by reference to the accompanying drawing which illustrates apparatus incorporating a preferred embodiment of the present invention and capable of carrying out the method of the invention. In the drawings.

Figure 1:
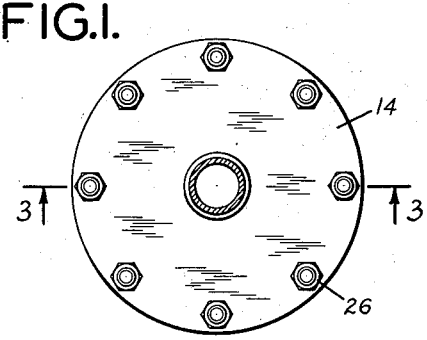
Fig. 1 is a top plan view of the apparatus.
Figure 4:
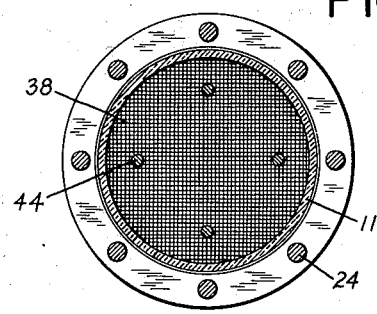
Fig. 4 is a transverse section taken on the line 4—4 of Fig. 3 and showing the lower electrode in bottom plan view.
Figure 2:
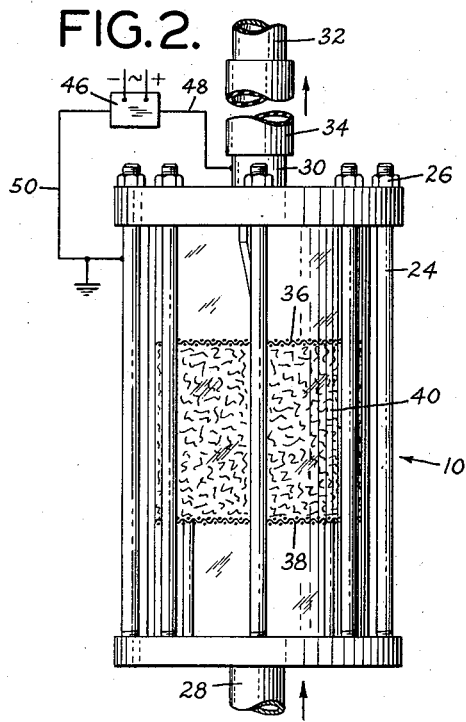
Fig. 2 is an elevation view of the apparatus showing the manner in which the apparatus casing is constructed.

In accordance with one aspect of the method of the invention the dry cleaning solvent or other liquid containing suspended particles that are to be removed is caused to flow through a loosely packed maze of non-conductive material and the maze is subjected to the action of an electrostatic field to cause the particles to be deposited on the surfaces of the non-conductive material. The term "loosely packed" as used in the present specification and claims is intended to describe a maze that is so loosely packed that it performs no appreciable mechanical filtering action on the suspension flow therethrough. The use of such a loosely packed maze presents important advantages in the removal of suspended particles from a liquid medium in that the pressure drop through such a maze is very small as compared with the pressure drop through a conventional filter and the flow rates obtainable per unit cross-sectional area of the flowing stream are greatly in excess of those that can be obtained with a conventional filter. The present method can be most easily understood by reference to the drawing which illustrates apparatus for carrying out the method.

Figure 3:
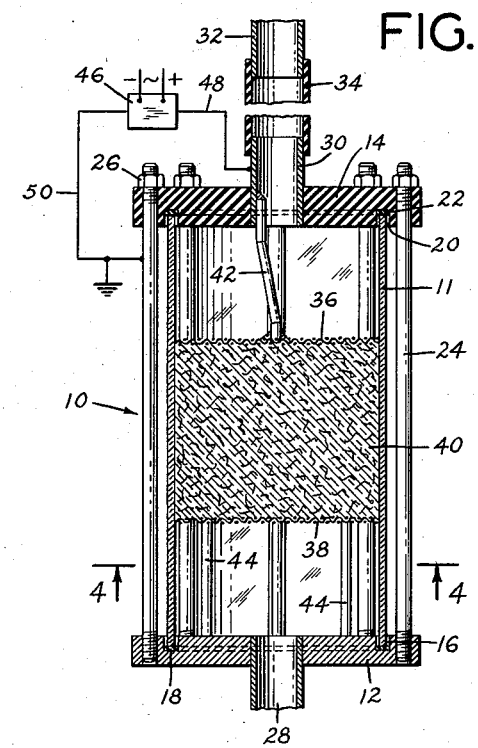
Fig. 3 is an axial section taken on the line 3—3 of Fig. 1 and showing the relationship between the electrodes and the dielectric maze between the electrodes.

Referring to the drawing, and more particularly to Fig. 3, the numeral 10 generally designates a precipitator which comprises a cylindrical conduit 11, made of a suitable non-conductive material such as glass, hard rubber or a plastic, and the end caps 12 and 14. The end cap 12 is preferably made of a metal and has formed therein an annular groove 16 into which the lower end of cylindrical conduit 11 fits. A gasket 18 is provided between the lower edge of conduit 11 and end cap 12 to ensure a liquid-tight seal between these two elements. The top of the conduit 11 fits into a groove 20 in the upper end cap 14 and a gasket 22 is provided between the conduit 11 and upper end cap 14 to ensure a liquid-tight seal therebetween. The end cap 14 is preferably made of a non-conductive material.

The end caps 12 and 14 are held in place against the conduit 11 by means of the tie rods 24 which are threaded into the lower end cap 12 and provided at their upper ends with the nuts 26 that may be taken up to urge the end caps 12 and 14 against the lower and upper end of conduit 11 respectively to provide a liquid-tight casing.

The lower end cap 12 is provided with an inlet connection 28 through which liquid may be introduced into the bottom of conduit 11 and end cap 14 is provided with a discharge nipple 30 through which liquid may be discharged from conduit 11. The nipple 30 is connected to a discharge pipe 32 by means of a connector 34 made of a non-conductive substance, such as rubber, and hence the discharge nipple 30 is electrically insulated from the discharge pipe 32.

Mounted within the conduit 11 there are a pair of electrodes 36 and 38 which, as shown, are discs of metal screen material arranged horizontally and extending to the walls of the conduit 11. The space between the electrodes 36 and 38 is filled with a loosely packed fibrous dielectric material such as the finely spun glass wool 40. As pointed out hereafter other dielectric materials may be used in place of the glass wool 40.

The electrode 36 is electrically connected to the discharge nipple 30 by a conductor 42 which also serves to support and position the electrode 36. The lower electrode 38 is supported from the lower end cap 12 by means of the rods 44 which also serve to provide an electrical connection between the electrode and end cap.

The loosely packed glass wool maze 40 is subjected to the action of an electrostatic field by application of a relatively high D. C. potential to the electrodes 36 and 38 from a suitable high potential source 46. The source 46 may, for example, be a conventional "power pack" which receives energy from a relatively low voltage alternate current source and converts it into direct current at the desired relatively high voltage. The positive pole of the source 46 is connected by a conductor 48 to the discharge nipple 30 and hence is effectively connected to the upper electrode 36. The negative pole of the source 46 is connected by a conductor 50 to one of the tie rods 24 and hence is effectively connected through end cap 12 and rods 44 with the lower electrode 38. If desired, the lower electrode may be grounded as indicated in Fig. 3.

Figure 5:
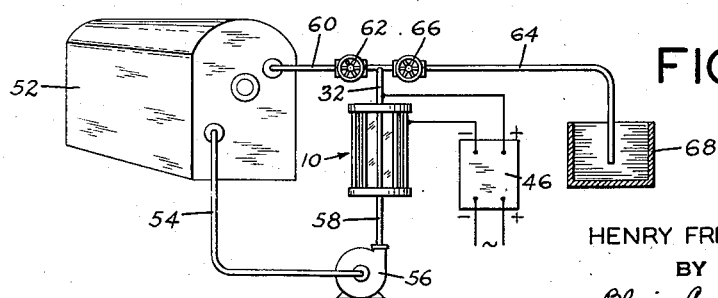
Fig. 5 is a flow diagram illustrating the manner in which the apparatus may be connected into a solvent circulating system.

One way in which the precipitating apparatus of the present invention may be used is illustrated in Fig. 5 of the drawings. Referring to Fig. 5 the numeral 52 designates a conventional tumbler wherein goods to be dry cleaned may be washed with a solvent as previously described. The used solvent is continuously withdrawn from the washer 52 through a pipe 54 by a pump 56 which pumps the solvent through a pipe 58 to and through precipitator 10. From the precipitator 10 solvent flows through discharge pipe 32 and may flow either through a pipe 60 containing a shutoff valve 62 to the washer 52 or through a pipe 64 containing shutoff valve 66 to a storage tank 68.

The operation of the precipitator of the present invention when incorporated in the system shown in Fig. 5 is largely manifest from the foregoing description. The electrodes 36 and 38 are charged to a suitable voltage, say 10,000 to 15,000 volts. Dry cleaning solvent containing suspended dirt particles is pumped by the pump 56 from the washer 52 to the precipitator 10 and flows through the interstices in the electrode 38, thence through the glass wool maze 40 and the interstices in the electrode 36 to the discharge pipe 32. The valve 66 is normally closed and the valve 62 is normally open to cause the solvent flowing through discharge pipe 32 to be returned through pipe 60 to the washer.

As the solvent flows through the maze 40 the suspended particles are deposited on the surfaces of the glass wool fibers. While I do not wish to be bound by any particular theory of operation of the device, my present understanding is that the charged electrodes produce an electrostatic field such that charges are induced on the surfaces of the glass wool fibers 40 and the suspended particles in the solvent are attracted to and held on the fiber surfaces by these induced charges. Whatever may be the proper theoretical explanation of the operation of the present precipitator, it has been found that effective clarification of a dry cleaning solvent can be achieved by the use of the present device and hence by using the system of Fig. 5 suspended dirt can be continuously removed from the dry cleaning solvent and clarified solvent returned to the washer.

When it is desired to remove the dirt particles from the surfaces of the maze the potential source 46 is disconnected, valve 62 closed, valve 66 opened, and the dirt is flushed out of the maze into the storage tank 68. The loose packing of the maze 40 facilitates removal of the dirt particles deposited thereon. It has been found that a substantial proportion of the deposited dirt can be removed from the maze by such a simple flushing operation. When complete removal of the precipitated dirt from the precipitator is desired, the precipitator may be disassembled and the glass wool maze removed and cleaned or replaced by a fresh quantity of glass wool. It is apparent from a consideration of the structure shown in the drawing that the glass wool maze can be easily and rapidly removed from the precipitator and that its removal is neither so laborious nor so time-consuming as the operation of cleaning a conventional filter press.

It has been found that the presence of certain foreign materials in the liquid medium decreases the effectiveness of the precipitating action and it is therefore desirable that the liquid medium be free from these materials. In the case of a dry cleaning solvent, for example, the presence of water and/or soap in the solvent tend to decrease the effectiveness of the precipitating action. In general it is desirable that the liquid medium be as nearly non-conductive as practicable.

In order to point out more completely the nature of the present invention the following specific example is given to illustrate a typical set of operating conditions for the present device. A precipitator was constructed as described above and having a cross-sectional area of about one square foot. The electrodes were formed of 10-mesh galvanized iron screen and were spaced 5 inches apart. The space between the electrodes was filled with approximately 0.8 pounds of finely spun glass wool. A flow of Stoddard solvent, which had previously been used in a dry cleaning operation and contained finely divided suspended dirt particles, was established through the precipitator. A potential of 13,000 volts i. e. 2600 volts per inch was used across the two electrodes and it was found that complete clarification of the solvent could be achieved with flow rates as high as 10 gallons per minute. This flow rate was compared with flow rates obtainable on conventional filters with the same solvent and it was found that with the present precipitator flow rates could be achieved of the order of 20 times those obtainable with conventional filters.

The flow rate, voltage and electrode spacing appear to be interrelated. Thus if it is desired to use a higher flow rate than indicated in the foregoing example and still obtain complete clarification, the voltage used should be increased or the electrode spacing decreased. Similarly, if it is desired to decrease the voltage for a given flow rate, the electrode spacing should be decreased.

From the foregoing example it may be noted that the screen electrodes have holes that are relatively large with respect to the size of the dirt particles and that the glass wool fibers are loosely packed so that there is no mechanical filtering action with this structure and the removal of the suspended matter is accomplished entirely by electrostatic action. Moreover the finely spun glass wool presents a very large surface area on which suspended particles may deposit. This large effective precipitating area together with the loose packing of the maze material permits the use of exceptionally high flow rates.

It is, of course, to be understood that the foregoing example is illustrative only and numerous changes in structure and modifications in operating conditions may be made within the scope of the invention. Although it has been found that finely spun glass wool is particularly useful in the present precipitator, other high dielectric materials that are capable of forming a loosely packed maze may be used. Thus such materials as rock wool as well as synthetic plastic fibers and the like may be used. Also non-fibrous materials such as electrically non-conductive granular materials may be used, although fibrous materials are preferred since in general they are more effective in providing the desired combination of large surface area and loose packing. The present precipitator is not limited to its application in the removal of suspended dirt particles from a dry cleaning solvent, but may also be used to remove other types of suspended foreign materials from other types of non-conductive liquid media. For example, it may be used to remove suspended carbon particles from a lubricating or transformer oil.

Since many embodiments might be made of the present invention and since many changes might be made in the embodiment disclosed herein, it is to be understood that the foregoing description is to be interpreted as illustrative only and not in a limiting sense.

I claim:

1. The method of removing suspended dirt particles from a used petroleum base dry cleaning solvent at high flow rates which comprises passing said solvent through a loosely packed maze of glass wool at a flow rate of at least about 10 gallons per minute per square foot of filter area and subjecting said maze to an electrostatic field by applying across said maze a direct current potential of 10,000 to 15,000 volts to cause said particles to deposit substantially uniformly on the surfaces of said glass wool.

2. The method of removing suspended dirt particles from a used petroleum base dry cleaning solvent at high flow rates which comprises passing said solvent through a loosely packed maze of glass wool at a flow rate of at least about 10 gallons per minute per square foot of filter area and maintaining across said maze a direct current potential gradient of about 2600 volts per inch of electrode separation to cause said particles to deposit on the surfaces of said glass wool.

HENRY FREDERICK HAMLIN.

REFERENCES CITED

The following references are of record in the file of this patent:

UNITED STATES PATENTS

| Number | Name | Date |
| --- | --- | --- |
| 1,162,212 | Bloom | Nov. 30, 1915 |
| 1,162,213 | Bloom | Nov. 30, 1915 |
| 1,606,699 | De Groote | Nov. 9, 1926 |
| 1,796,750 | Eddy | Mar. 17, 1931 |
| 2,116,509 | Cottrell | May 10, 1938 |
| 2,428,328 | Ham et al. | Sept. 30, 1947 |